United States Patent Office
3,660,356
Patented May 2, 1972

3,660,356
POLYESTER AMIDE ELASTOMERS CONTAINING POLYETHER UNITS
Eduard Radlmann, Lothar Ruetz, and Gunther Nischek, Dormagen, Germany, assignors to Farbenfabriken Bayer Aktiengesellschaft, Leverkusen, Germany
No Drawing. Filed Apr. 23, 1970, Ser. No. 31,408
Claims priority, application Germany, Apr. 29, 1969,
P 19 21 738.0
Int. Cl. C08g 20/30
U.S. Cl. 260—75 N
11 Claims

ABSTRACT OF THE DISCLOSURE

High molecular weight linear polyester amide elastomers obtained by polycondensing amide groups containing dicarboxylic acid esters, optionally together with normal dicarboxylic acid esters, with linear aliphatic polyether diols. The elastomers are processable to obtain films and fibers.

---

Polyester amide elastomers containing polyether units

The invention relates to polyesteramide elastomers which are obtained by the condensation in the melt of low molecular weight dicarboxylic esters, which contain amide groups, with aliphatic polyether diols.

It is known that elastic polyether or polyester amides can be prepared by the polycondensation in solution of polyethers or polyesters in the molecular weight range of from 500 to 5000 which contain carboxylic acid halide end groups, with oligo-amides which have a minimum molecular weight of 230. When this process is employed, the processing of the products so as to form filaments can only be carried out from solutions.

It is an object of this invention to provide new polyesteramide elastomers that have excellent mechanical properties and which are easily processed.

This object is accomplished by a high molecular weight, linear polyester amide elastomer consisting of from 80 to 100 mols percent of recurrent structural elements of the general formula:

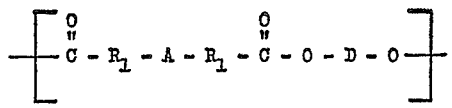

and from 0 to 20 mols percent of recurrent structural elements of the general formula:

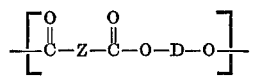

in which $R_1$ is a single bond, an alkylene, aralkylene, alkarylene, phenylene, diphenylene or naphthylene radical or the radical of the general formula:

—Ar—X—Ar— in which

X is —O—, —S—, —SO$_2$— or —CO$_2$—, an alkylene radical, or the radical

—O—Ar—SO$_2$—Ar—O— and
Ar is an arylene radical,
A is a radical of the formulae:

—Y—R$_2$—Y—, —Y—R$_2$—Y—R$_3$—Y— or
—Y—R$_2$—Y—R$_3$—Y—R$_2$—Y— in which $R_2$ and $R_3$, being different or not, have the same meaning as $R_1$
Y is a carbonamide group with the sequence of radicals:

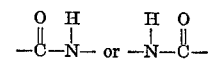

provided that if 2 radicals Y are adjacent, they are linked together by the carbonyl groups,
D is the radical of a linear, aliphatic polyether diol of molecular weight of from 400 to 4000 without the two terminal OH groups, and
Z is the radical of a mononuclear or binuclear aromatic dicarboxylic acid in which the two aromatic nuclei are linked together by a single bond, by —O—, —S—, —SO$_2$— or —CO— or an alkylene group, said alkylene group being uninterrupted or interrupted by —O—.

said polyester amide elastomer having a relative solution viscosity $\eta_{rel}$ of 1.1 to 3.0 (measured on a 0.2% solution in chloroform at 25° C.).

These new polyester amide elastomers can very easily be processed from the melt.

It is another object of this invention to provide a process for the production of the aforementioned new polyester amide elastomers.

This object is accomplished by a process, which comprises polycondensing 80 to 100 mols percent of a dicarboxylic acid ester (A) which contains amide groups and has the general formula:

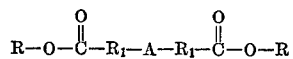

in which

R is a phenyl radical, a linear or branched alkyl radical containing from 1 to 10 carbon atoms or an ω-oxyalkyl radical containing from 2 to 10 carbon atoms,
$R_1$ is a single bond, an alkylene, aralkylene, alkarylene, phenylene, diphenylene or naphthylene radical or the radical of the general formula:

—Ar—X—Ar— in which

X is —O—, —S—, —SO$_2$— or —CO$_2$—, an alkylene radical or the radical —O—Ar—SO$_2$—Ar—O— and
Ar is an arylene radical, and
A is a radical of the formulae:

—Y—R$_2$—Y—, —Y—R$_2$—Y—R$_3$—Y— or
—Y—R$_2$—Y—R$_3$—Y—R$_2$—Y— in which $R_2$ and $R_3$, being different or not, have the same meaning as $R_1$,
Y is a carbonamide group with the sequence of radicals:

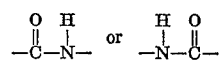

provided that if two radicals Y are adjacent they are linked together via the carbonyl groups,
and from 0 to 20 mols percent of a dicarboxylic acid ester (B) of the general formula:

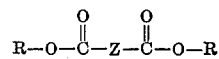

in which

R has the meaning given above, and

Z is the the radical of a mononuclear or binuclear aromatic dicarboxylic acid in which the two aromatic nuclei are linked together by a single bond, by —O—, —S—, SO₂— or —CO— or an alkylene group, said alkylene group being uninterrupted or interrupted by —O— with alinear aliphatic polyether diol of molecular weight of from 400 to 4000 of the general formula:

HO—D—OH in which

D is the radical of a linear, aliphatic polyether diol of the molecular weight of from 400 to 4000 without the two terminal OH groups, said polycondensing being carried out in the melt at a temperature of from 150 to 300° C. in the absence of oxygen and moisture, in an inert gas atmosphere at a pressure of between normal pressure and 0.001 mm. Hg using known catalysts.

Instead of using only a single dicarboxylic acid ester (A) it is of course also possible to use a mixture of different esters. Also, a mixture of different polyether diols can be used instead of one single diol.

After the reaction is terminated, the products are shaped from the melt. Certain types of elastomers are soluble, and can be shaped from solution so as to form foils and filaments.

The amide-containing dicarboxylic acid esters used for the preparation of the new elastomers can be prepared by known processes, e.g. by the following methods:

(a) By etherification of aminocarboxylic acids and reaction with dicarboxylic acid dihalides in the molar ratio of 2:1 (German patent specification 950,466).

(b) By reaction of aminocarboxylic acids with dicarboxylic acid dihalides in the ratio 2:1 and esterfication of the resulting dicarboxylic acids (German patent specification 950,466).

(c) By reaction of diamines with excess quantities of dicarboxylic acid esters (U.S. patent specification 2,945,011).

(d) By reaction of nitrocarboxylic acid halides with aminocarboxylic acid esters, hydrogenation of the nitro group and reaction of the resulting amino compound with dicarboxylic acid halides in the molar ratio of 2:1 (German patent specification 950,466).

(e) By reaction of nitrocarboxylic acid halides with diamines in the molar ratio of 2:1, hydrogenation of the resulting dinitro compound so as to form the diamino compound, and reaction of the resulting diamine with an excess of a dicarboxylic acid ester (U.S. patent specification 2,945,011).

The following compounds are mentioned as examples of such dicarboxylic acid esters:

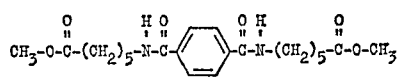

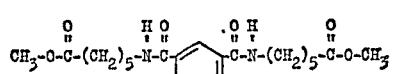

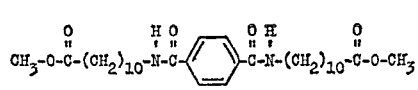

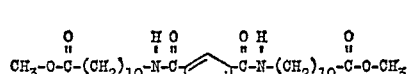

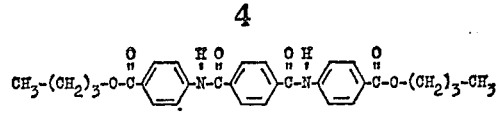

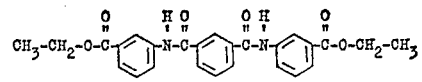

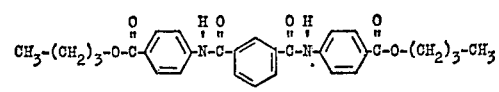

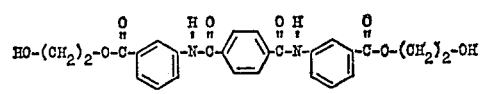

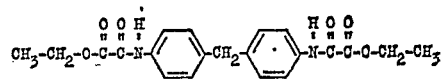

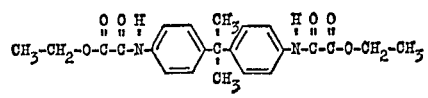

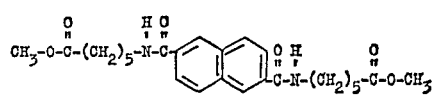

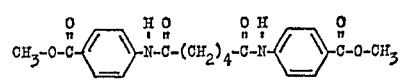

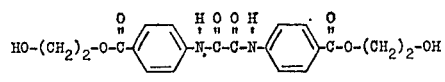

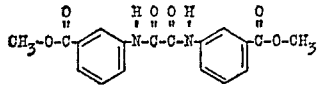

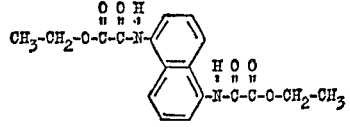

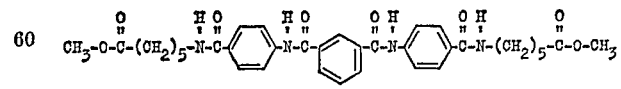

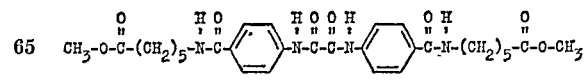

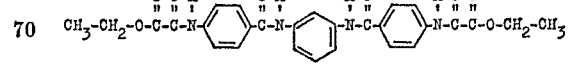

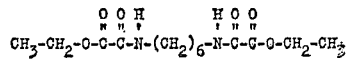

Up to 20 mols percent of the following dicarboxylic acid esters, for example, may be used in admixture with these amidedicarboxylic acid esters:

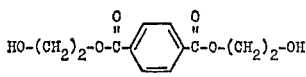

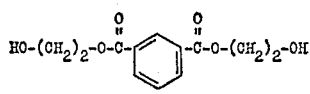

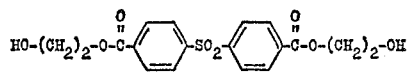

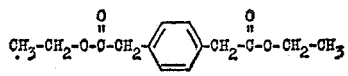

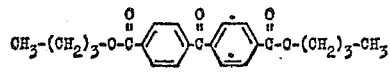

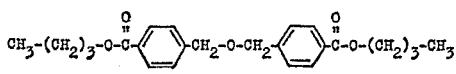

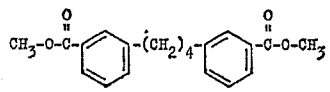

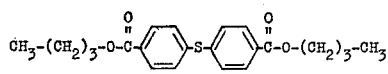

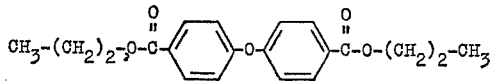

It is preferable to use the bis-glycol esters and, of these, it is preferable to use terephthalic acid bis-glycol ester. The polyether diols used may be compounds obtained by known processes by the polycondensation of suitable diols, such as hexane-1,6-diol, heptane-1,7-diol, octane-1,8-diol, decane-1,10-diol, xylylene glycol, or bis-hydroxymethyl cyclohexane or the hydroxyethylation products of the above mentioned diols. It is preferable to use diols which can be prepared by the polymerisation of the corresponding monomers, such as ethylene oxide, propylene oxide or tetrahydrofuran.

Polyether diols having average molecular weights in the region of 400 to 4000 are used. Low molecular weight diols such as ethylene glycol, propylene-1,3-glycol, butane-1,4-diol, hexane-1,6-diol, decane-1,10-diol or dodecane-1,12-diol may be used in admixture with these higher molecular weight diols.

The catalysts used are conventional ester interchange or condensation catalysts, for example alkali metals and alkaline earth metals, zinc, cadmium, manganese, iron, nickel, cobalt, tin, lanthanum, lead or bismuth or combinations of these metals, salts such as calcium, manganese, cobalt or zinc acetate, lithium hydride, sodium alcoholates, zinc succinate or zinc acetyl acetonate, oxides such as lead oxide (PbO), antimony oxide ($Sb_2O_3$), or germanium oxide ($GeO_2$), and combinations such as antimony trioxide/manganese acetate or antimony trioxide/titanium dioxide. $GeO_2$ is preferably used.

The catalysts are used in quantities of from 0.005 to 0.2% by weight, preferably from 0.01 to 0.10% by weight, based on the quantity of dicarboxylic acid ester.

In a preferred embodiment of the process of the invention, the reaction mixture which contains ester groups and hydroxyl groups, preferably in equivalent quantities, is heated to from 150 to 200° C. for from 1 to 4 hours with stirring in the presence of an inert gas such as nitrogen, hydrogen or helium. The reaction mixture is then heated to from 225 to 280° C. for from 1 to 3 hours with continued stirring in the same atmosphere. Thereafter, the pressure is reduced, generally to below 15 mm. Hg, preferably below 1 mm. Hg, while the temperature is maintained at from 225 to 250° C. These conditions are maintained for a further time of from 1 to 18 hours with stirring. After termination of the reaction, the elastic polycondensate can be immediately shaped from the melt so as to form highly elastic filaments, foils and elastic mouldings. Furthermore, the polycondensate can be worked up by spraying, calendering, or pressure moulding or by using a mixing roller so that fillers can be incorporated.

Cross-linking can be brought about by the addition of peroxides, but in view of the good elastic properties of the polyester amides, this is only rarely desirable.

The new elastomers are characterised by their excellent mechanical properties and their satisfactory properties with regard to processing.

The following examples are to further illustrate the invention without limiting it.

EXAMPLE 1

42.0 parts by weight of the amide dicarboxylic acid ester of the formula:

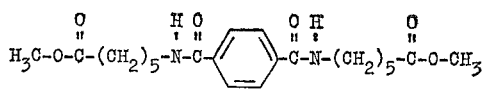

(M.P. 166 to 167° C., prepared by method (a), see col. 3), and 100.0 parts by weight of a polytetrahydrofuran which contains hydroxyl end groups and has an average molecular weight of 1000, are introduced into a reaction vessel which is equipped with an anchor agitator, a gas inlet tube, a fractionating column, a cooler, a vacuum feed and receiver. A solution of 0.04 part by weight of $GeO_2$ in 10 parts by weight of ethylene glycol is added to this mixture. The mixture is then slowly heated in a metal bath to from 200 to 220° C. and at the same time stirred at the rate of from 100 to 150 revs./min. while pure nitrogen is passed over the mixture. Most of the methanol has distilled off by the end of one hour. Ethylene glycol distills off after the temperature is raised to 250° C. The supply of nitrogen is then stopped and the pressure is slowly reduced to 0.05 mm. Hg in the course of about one hour. Owing to the sharp rise in the viscosity of the reaction mixture, the rate of stirring must be reduced stepwise to about 30 to 40 revs./min. After a condensation time of 10 hours at 250° C./0.05 mm. Hg, the colourless, clear elastomer melt becomes so viscous that it can no longer be stirred. Filaments which have an elastic elongation of 720% at room temperature, a sticking temperature of from 215 to 235° C., and a relative solution viscosity of $\eta_{rel}=1.31$ (measured in chloroform at 25° C. and at a concentration of 0.2 g. in 100 ml.), can be spun from the melt. The polymer can also be worked up into foils from the solution.

EXAMPLE 2

105.0 parts by weight of the amide dicarboxylic acid ester of the formula:

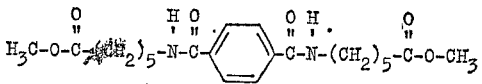

together with 6.4 parts by weight of the bis-(2-hydroxyethyl)-ester of terephthalic acid, 250.0 parts by weight of polytetrahydrofuran which has hydroxyl end groups (M.W.=1000) and 0.1 part by weight of GeO₂ in 20 parts by weight of ethylene glycol are introduced into a reaction vessel as described in Example 1. The mixture is heated to 220° C. with stirring and introduction of nitrogen, methanol distilling off. After 2 hours, the pressure is gradually reduced to 0.05 mm. Hg and the temperature is then increased to 270° C. Condensation was continued for a further 6 hours under these conditions. The elastomer obtained was colourless and clear. Filaments which have a sticking range of from 220 to 244° C. and an elastic elongation of 635% can be drawn from the melt. The relative viscosity is $\eta_{rel.}=1.27$ (measured in chloroform at 25° C. and a concentration of 0.2 g. in 100 ml.). Also, filaments and foils can be produced from solutions.

EXAMPLE 3

28.0 parts by weight of the amide dicarboxylic acid ester:

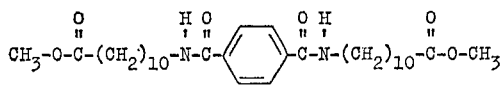

(M.P. 156 to 157° C., prepared by method (a), see col. 3), together with 50.0 parts by weight of polytetrahydrofuran having hydroxyl end groups (M.W.=1000) and 0.03 part by weight of calcium acetate and 0.08 part by weight of antimony trioxide, are heated to 220° C. with stirring in a condensation vessel as described in Example 1, while nitrogen is passed over the mixture. As soon as the major quantity of methanol has distilled off, the pressure is reduced to 0.1 mm. Hg and the temperature is raised to 260° C. After a condensation time of 10 hours, the reaction is stopped because the viscosity of the melt makes stirring impossible. The elastomer is clear and colourless and can be spun from the melt into filaments which have a sticking point in the region of 225° C. and an elastic elongation of 540%. The polymer is soluble in chloroform ($\eta_{rel.}=1.40$ measured in chloroform at 25° C. at a concentration of 0.2 g. in 100 ml.).

EXAMPLE 4

79.8 parts by weight of the diester of the formula:

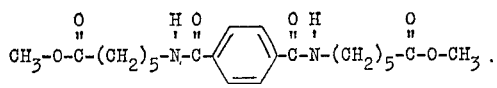

4.0 parts by weight of the diester of the formula:

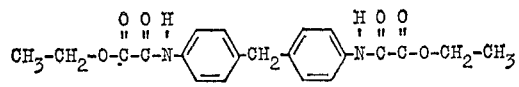

(M.P. 149 to 151° C., prepared by method (c), see col. 3), 2.6 parts by weight of bis-(2-hydroxyethyl)-terephthalate, 150.0 parts by weight of polytetrahydrofuran with hydroxyl end groups (M.W.=1000), 18.5 parts by weight of 2,2-bis-4-(2-hydroxyethoxy)-phenyl propane and 0.1 part by weight of GeO₂ in 10 parts by weight of ethylene glycol, are introduced into the apparatus as described in Example 1. The reaction mixture is then heated to 220° C. with stirring while nitrogen is passed over the mixture. Most of the methanol and ethanol have distilled off by the end of two hours and the pressure is gradually reduced to 0.05 mm. Hg and the temperature raised to 275° C. After a condensation time of 11 hours, the experiment must be stopped owing to the high viscosity. Filaments spun from the melt have an elastic elongation of 510% and are colourless and translucent. They have a sticking range of 235 to 245° C.

EXAMPLE 5

41.2 parts by weight of the diester of the formula:

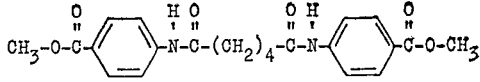

(M.P. 237 to 239° C., prepared by method (a), see col. 3), together with 2.6 parts by weight of bis-(2-hydroxyethyl)-terephthalate, 96.7 parts by weight of polypropylene oxide with hydroxyl end groups (M.W.=967) and 0.08 part by weight of GeO₂ in 10 parts by weight of ethylene glycol are heated to 220° C. in the condensation apparatus as described in Example 1 with stirring while nitrogen is passed over the mixture. When most of the methanol and ethylene glycol have been distilled off, the vessel is gradually evacuated to 0.1 mm. Hg and the temperature is raised to 250° C. After 10 hours' condensation, the elastic material is spun from the melt. The colourless filaments can be stretched to 490% and start to stick at 210° C.

EXAMPLE 6

In the condensation apparatus described in Example 1, 25.8 parts by weight of the diester of the formula:

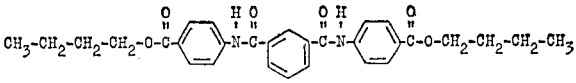

(M.P. 188° C., prepared by method (a), see col. 3), together with 102.0 parts by weight of a polytetrahydrofuran with hydroxyl end groups (M.W.=2040) and 0.05 part by weight of GeO₂ in 10 parts by weight of ethylene glycol are heated up to 295° C. with stirring while nitrogen is passed over the mixture. After 2 hours, a clear melt is obtained and most of the n-butanol has distilled off. The pressure is then gradually reduced to 0.05 mm. Hg and condensation is continued for 8 hours. After condensation has terminated, the elastomer melt is spun into filaments which have an elastic elongation of 570% and a sticking range of 245 to 257° C.

EXAMPLE 7

29.1 parts by weight of the diester of the formula:

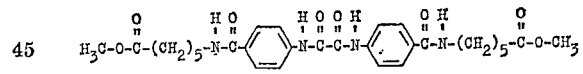

(prepared by method (d), see col. 3), together with 2.6 parts by weight of bis-(2-hydroxyethyl)-terephthalate, 102.0 parts by weight of polytetrahydrofuran with hydroxyl end groups (M.W.=2040) and 0.02 part by weight of GeO₂ in 40 parts by weight of ethylene glycol are heated up to 230° C. in the apparatus as described in Example 1 with stirring while nitrogen is passed over the mixture. After removal of most of the methanol and ethylene glycol by distillation, the pressure is slowly reduced to 0.05 mm. Hg and the temperature finally raised to 275° C. After 12 hours' condensation, the viscosity of the colourless, clear melt is so high that stirring is no longer possible. The filaments spun from the melt stick in the range of from 235 to 260° C. and have an elastic elongation of 594%. The polymer is soluble in chloroform ($\eta_{rel.}=1.36$ measured in chloroform at 25° C. and a concentration of 0.2 g. in 100 ml.).

EXAMPLE 8

23.5 parts by weight of the diester:

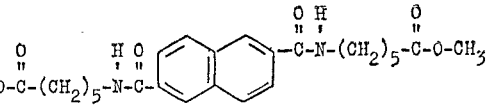

(prepared by method (a)), together with 2.6 parts by weight of bis-(2-hydroxyethyl)-terephthalate, 51.5 parts by weight of polytetrahydrofuran with hydroxyl end groups (M.W.=1030) and 0.05 part by weight of GeO₂ in 10 parts by weight of ethylene glycol are heated to 230° C. with stirring in the condensation apparatus as described in Example 1 while nitrogen is passed over the mixture. After removal of most of the methanol and ethylene glycol by distillation, the pressure is slowly reduced to 0.05 mm. Hg and the temperature raised to 250° C. After a condensation time of 7 hours, the viscosity of the colourless clear melt is so high that stirring is no longer possible. The filaments spun from the melt have an elastic elongation of 185% and a sticking range of from 225 to 238° C. They are clourless and translucent. The polymer is soluble in chloroform and in dimethyl formamide. Filaments and foils can be produced from this solution. The relative viscosity of the solution is $\eta_{rel.}=1.52$ (measured in chloroform at 25° C. and a concentration of 0.2 g. in 100 ml.).

What we claim is:

1. A high molecular weight, linear polyester amide elastomer consisting of from 80 to 100 mols percent of recurrent structural elements of the general formula:

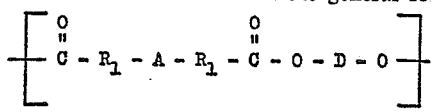

and from 0 to 20 mols percent of recurrent structural elements of the general formula:

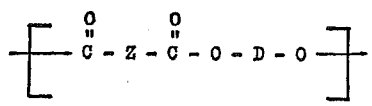

in which $R_1$ is a single bond, an alkylene, aralkylene, alkarylene, phenylene, diphenylene or naphthylene radical or the radical of the gerenal formula:

—Ar—X—Ar— in which

X is —O—, —S—, —SO$_2$— or —CO$_2$—, an alkylene radical, or the radical

—O—Ar—SO$_2$—Ar—O— and

Ar is an arylene radical,

A is a radical of the formulae:

—Y—R$_2$—Y—, —Y—R$_2$—Y—R$_3$—Y— or

—Y—R$_2$—Y—R$_3$—Y—R$_2$—Y— in which

R$_2$ and R$_3$, being different or not, have the same meaning as R$_1$,

Y is a carbonamide group with the sequence of radicals:

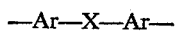

provided that if 2 radicals Y are adjacent, they are linked together by the carbonyl groups, D is the radical of a linear, aliphatic polyether diol of molecular weight of from 400 to 4000 without the two terminal OH groups, and Z is the radical of a mononuclear or binuclear aromatic dicarboxylic acid in which the two aromatic nuclei are linked together by a single bond, by —O—, —S—, SO$_2$— or —CO— or an alkylene groups, said alkylene group being uninterrupted or interrupted by —O— said polyester amide elastomer having a relative solution visocosity $\eta_{rel}$ of 1.1 to 3.0 (measured on a 0.2% solution in chloroform at 25° C.).

2. Elastic fibres and filaments consisting of high molecular weight linear polyester amide elastomers according to claim 1.

3. The high molecular weight polyester amide of claim 1 in which R$_1$, R$_2$ and R$_3$ are the same or different and are selected from the group consisting of a single bond, alkylene of up to 10 carbon atoms, phenylene, diphenylene, naphthylene, or —Ar—X—Ar in which X is —O—, —S—, —SO$_2$—, alkylene of 1 to 3 carbon atoms, or —O—Ar—SO$_2$—Ar—O— and Ar is phenylene;

D is the radical of a linear, polyether diol of molecular weight 400 to 4,000 without the two terminal OH groups in which the radicals between the polyether oxygen atoms are alkylene of up to 10 carbon atoms, xylylene or dimethylcyclohexane; and Z is phenylene, diphenylene or diphenylene in which the two phenylene nuclei are linked together by —O—, —S—, —SO$_2$—, —CO—, alkylene of up to 4 carbon atoms, or alkylene up to 4 carbon atoms interrupted by —O—.

4. The high molecular weight polyester amide of claim 1 consisting of 100 mole percent of recurring structural elements of the formula

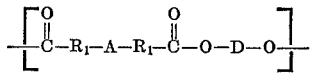

5. The polyester amide of claim 1 consisting of recurring structural units of the formula

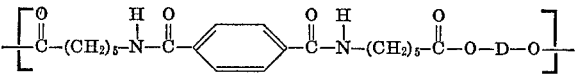

6. The polyester amide of claim 1 consisting of recurring structural units of the formula

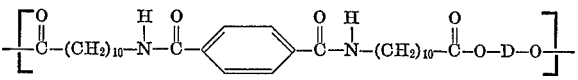

in which D is the radical of polytetrahydrofuran of molecular weight 400 to 4,000 without the two terminal OH groups.

7. The polyester amide of claim 1 consisting of from 80 to 100 mole percent of recurring structural units of the formula

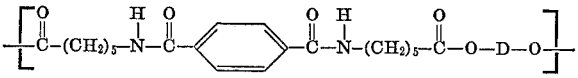

and the formula

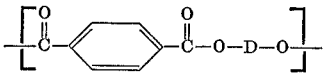

and from 0 to 20 mole percent of recurring structural units of the formula

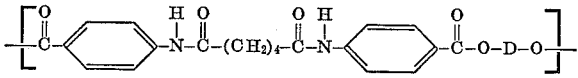

in which D is the radical of polytetrahydrofuran of molecular weight 400 to 4,000 without the two terminal OH groups.

8. The polyester amide of claim 1 consisting of from 80 to 100 mole percent of recurring structural units of the formula

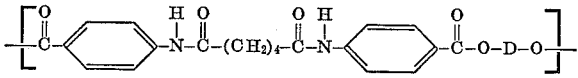

and from 0 to 20 mole percent of recurring structural units of the formula

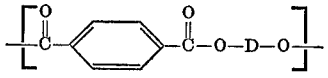

in which D is the radical of polypropylene glycol of molecular weight 400 to 4,000 without the two terminal OH groups.

9. The polyester amide of claim 1 consisting of recurring structural units of the formula

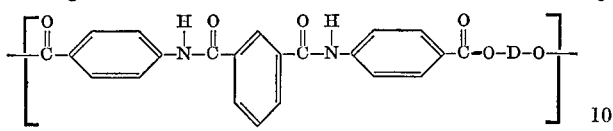

in which D is the radical of polytetrahydrofuran of molecular weight 400 to 4,000 without the two terminal OH groups.

10. The polyester amide of claim 1 consisting of from 80 to 100 mole percent of recurring structural units of the formula

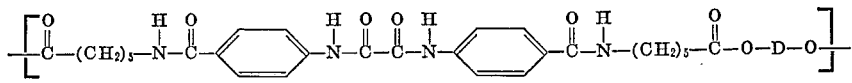

and from 0 to 20 mole percent of recurring structural units of the formula

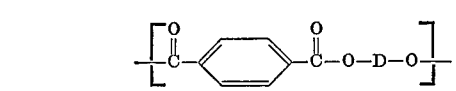

in which D is the radical of polytetrahydrofuran of molecular weight 400 to 4,000 without the two terminal OH groups.

11. The polyester amide of claim 1 consisting of from 80 to 100 mole percent of recurring structural units of the formula

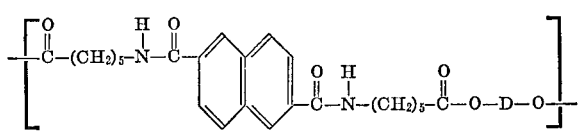

and from 0 to 20 mole percent of recurring structural units of the formula

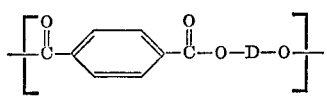

in which D is the radical of polytetrahydrofuran of molecular weight 400 to 4,000 without the two terminal OH groups.

References Cited

UNITED STATES PATENTS

| | | | |
|---|---|---|---|
| 2,839,508 | 6/1958 | Williams et al. | 260—75 |
| 2,851,443 | 9/1958 | Williams et al. | 260—75 |
| 2,954,364 | 9/1960 | Coleman et al. | 260—75 |
| 3,023,192 | 2/1962 | Shivers | 260—75 |
| 3,420,802 | 1/1969 | Scruggs | 260—75 |
| 3,493,632 | 2/1970 | Okazaki et al. | 260—857 |

FOREIGN PATENTS

| | | |
|---|---|---|
| 1,484,108 | 5/1967 | France. |
| 1,124,271 | 8/1968 | Great Britain. |

MELVIN GOLDSTEIN, Primary Examiner

U.S. Cl. X.R.

260—47 CP, 49, 76, 857